United States Patent [19]
Satomi

[11] Patent Number: 5,435,444
[45] Date of Patent: Jul. 25, 1995

[54] COMPOSITE TYPE SCREEN

[75] Inventor: Hitoshi Satomi, Shizuoka, Japan

[73] Assignee: Satomi Seisakusho Co., Ltd., Shizuoka, Japan

[21] Appl. No.: 207,180

[22] Filed: Mar. 8, 1994

[30] Foreign Application Priority Data

Nov. 16, 1993 [JP] Japan ................... 5-286341

[51] Int. Cl.⁶ .............................................. B07B 1/04
[52] U.S. Cl. ................... 209/234; 209/273; 209/300; 210/415
[58] Field of Search ............. 209/234, 268, 273, 281, 209/284, 300; 210/232, 260, 295, 298, 323.1, 323.2, 335, 413, 414, 415; 162/55, 251; 241/163

[56] References Cited

U.S. PATENT DOCUMENTS

| | | | |
|---|---|---|---|
| 4,462,901 | 7/1984 | Gauld | 209/234 |
| 4,657,636 | 4/1987 | Satomi | 210/413 X |
| 4,941,970 | 7/1990 | Ahs | 209/234 |
| 4,968,417 | 11/1990 | Ahs | 209/300 X |
| 5,074,995 | 12/1991 | Hoglund | 209/273 X |

FOREIGN PATENT DOCUMENTS 402238 12/1990 European Pat. Off. ............ 162/55

*Primary Examiner*—James R. Bidwell
*Assistant Examiner*—Tuan N. Nguyen
*Attorney, Agent, or Firm*—Kanesaka & Takeuchi

[57] ABSTRACT

A composite type screen includes a machine main body divided into a first structural part in which a first processing chamber is contained and a second structural part in which a second processing chamber is contained and a screen plate is interposed between the surfaces of the first structural part and the second structural part. Since a first rotary shaft having an impeller mounted thereto is disposed in the first processing chamber and a second rotary shaft having a rotor mounted thereto is disposed in the secondary processing chamber, the first rotary shaft does not pass through the first screen member. As a result, a seal member for the first screen member is not needed, whereby the number of parts is reduced and moreover a paper material can pass through the entire region of the first screen member and the area thereof through which the paper material passes is increased, so that a foreign substance removing efficiency can be improved.

9 Claims, 4 Drawing Sheets

COMPOSITE TYPE SCREEN

BACKGROUND OF THE INVENTION
1. Field of the Invention

The present invention relates to a screen for removing foreign substances from a raw material such as, for example, used paper, pulp and the like, and more specifically, to a composite type screen including a single machine main body provided with a plurality of screen members disposed therein.

2. Description of the Related Art

As shown in FIG. 4, a conventional composite type screen is arranged such that a first screen member, e.g., a screen plate 101 having round holes, is disposed in a cylindrical machine main body 100 so that the interior of the machine main body 100 is divided into a primary processing chamber A and a secondary processing chamber B. An opening on the primary processing chamber A side of the machine main body 100 is sealed with a lid 100A.

A motor 102 and a bearing 103 are disposed outside the machine main body 100. A rotary shaft 104 pivotally supported by the bearing 103 is inserted into the machine main body 100. The rotating force of the motor 102 is transmitted to the rotary shaft 104 through a belt 105.

The rotary shaft 104 has a first stirring member, e.g., an impeller 106 mounted thereon in the first processing chamber A side thereof and a second stirring member, e.g., a rotor 107 mounted thereon in the first processing chamber B side thereof.

The second processing chamber B includes a second cylindrical screen member, e.g., a cylindrical basket screen 108 disposed therein. The basket screen 108 has a function for capturing foreign substances smaller than the holes defined by the screen plate 101.

Further, the gap between the central hole (not shown) of the screen plate 10t and the rotary shaft 104 is sealed by a seal member 109 such as a gland packing and the like to prevent a raw material, e.g. a paper material in the primary chamber A from entering the second processing chamber B without passing through the screen plate 101.

The gap between the shaft hole (not shown) of the machine main body 100 and the rotary shaft 104 is sealed by a mechanical seal and the like to prevent the leakage of the paper material.

The machine main body 100 includes a raw material inlet, e.g. a paper material inlet 111 and a primary discharge port 112 each being connected to the primary processing chamber A as well as a paper material outlet 113 and a secondary discharge port 114 each being connected to the secondary processing chamber B.

The paper material charged into the primary processing chamber A under pressure from the paper material inlet 111 is stirred and unravelled by the impeller 106 being rotated. The unravelled paper material passes through the screen plate 101 and the foreign substances contained in the paper material are captured by the screen plate 101. The captured foreign substances are discharged from the primary discharge port 112.

The paper material which has been roughly selected when passing through the screen plate 101 also passes through the basket screen 108 while being stirred by the rotor 107 being rotated in the secondary processing chamber B.

The paper material which has been finely selected and separated from the foreign substances thereof when it passes through the basket screen 108 is discharged to the outside of the machine main body 100 from the paper material outlet 113 and the removed foreign substances are discharged from the secondary discharge port 114.

As described above, the paper material is differently processed in the primary processing chamber A and the secondary processing chamber B. Further, the machine main body 100 arranged as a single body is made compact by providing both the screen plate 101 and basket screen 108 therein.

Nevertheless, the prior art has the following problems because the single rotary shaft 104 is disposed in the state that it passes through the central portion of the screen plate 101 as well as both the impeller 106 and rotor 107 are mounted to the rotary shaft 104:

(1) since the impeller 106 and rotor 107 rotate at the same number of rotation at all times, the foreign substance removing functions of the first processing chamber A and second processing chamber B cannot be separately controlled in accordance with the variation of conditions such as a kind of a paper material, and the like;

(2) since the seal member 109 is interposed between the screen plate 101 and the rotary shaft 104, the number of parts is increased and a manufacturing cost is increased; and (3) since the rotary shaft 104 and seal member 109 are provided at the central portion of the screen plate 101, the area of the screen plate 101 through which a paper material passes is reduced and thus the foreign substance removing function of the screen plate 101 is lowered.

SUMMARY OF THE INVENTION

An object of the present invention for solving the above problems is to provide a composite type screen by which the foreign substance processing functions of a first or primary processing chamber and a second or secondary processing chamber can be separately controlled, the number of parts can be reduced and further a foreign substance removing function is improved.

According to the present invention, since a first stirring member and a second stirring member are separately mounted to a first rotary shaft and a second rotary shaft, the number of rotation of the first stirring member and that of the second stirring member can be separately set. Thus, the foreign substance removing function can be improved by controlling the number of rotation of the first stirring member and that of the second stirring member so that an optimum stirring and unravelling function can be obtained in accordance with various conditions.

Further, according to the present invention, since the first rotary shaft and second rotary shaft are separately disposed in the primary processing chamber and secondary processing chamber and they do not pass through a first screen, a seal member for the first screen is not needed, so that the number of parts can be reduced and a manufacturing cost can be suppressed.

Further, according to the present invention, since the first rotary shaft and second rotary shaft do not pass through the first screen member and the seal member for the first screen member is not used, a paper material can pass through the entire region of the first screen member and the area thereof through which the paper material passes can be increased, whereby a foreign substance removing efficiency can be improved.

Further, according to the present invention, a first structural part and a second structural part are divided in the vicinity of the first screen member so that they can be opened and closed and the first screen member is interposed between the surfaces thereof formed by the division. Thus the first screen can be exposed to the outside only by opening the first structural part from the second structural part. As a result, the first screen member can be cleaned, checked and replaced without removing the second stirring member from the second rotary shaft, whereby a manday can be reduced, a manday and working time can be reduced and a working efficiency can be improved.

Further, according to the present invention, since the first screen member is freely attached to and separated from the first structural part and second structural part, when the first screen member is spaced apart from the first structural part and second structural part, a working space around the first screen member is increased, whereby a working efficiency for cleaning and checking the interior of the first processing chamber, second processing chamber and screen plate and for replacing these components can be further improved.

DESCRIPTION OF THE PREFERRED EMBODIMENT

Figure 1:
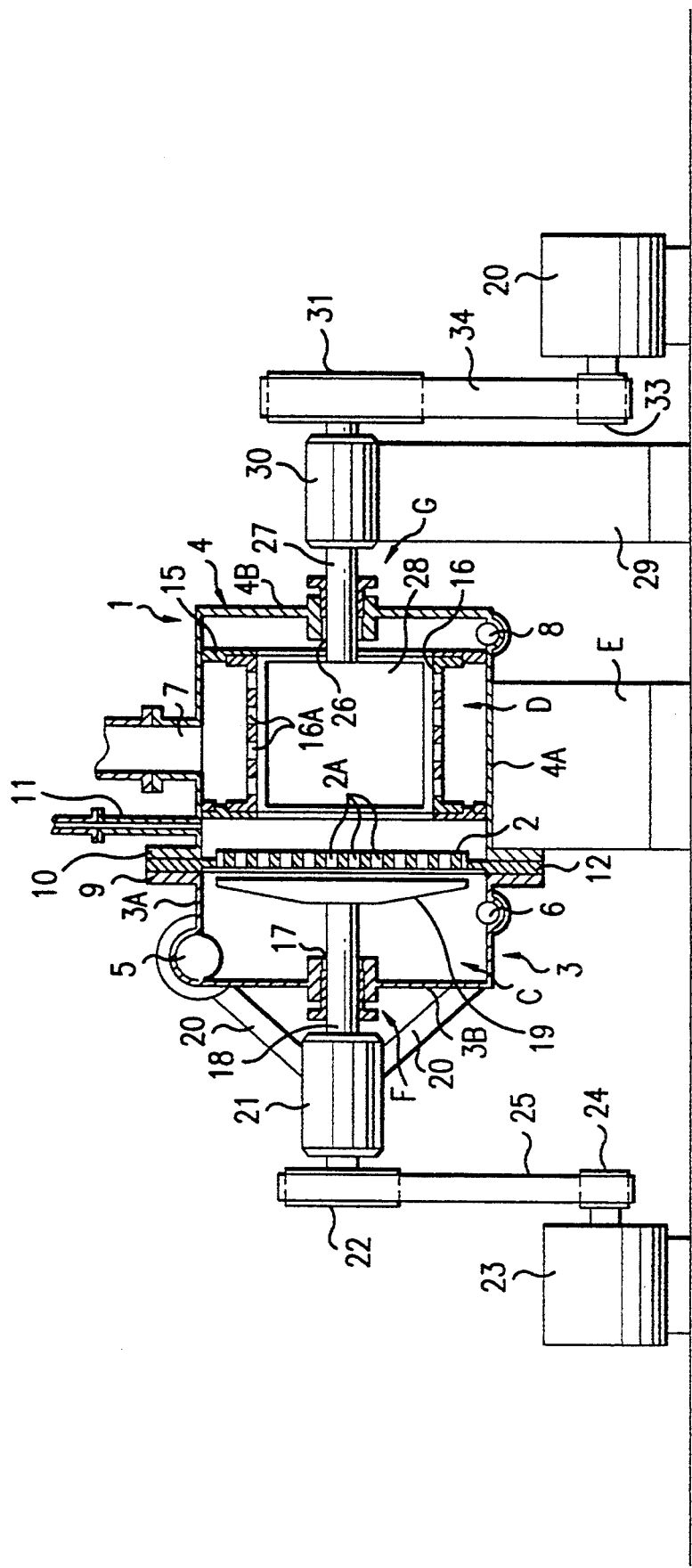
FIG. 1 is a schematic front cross sectional view of a composite type screen showing an embodiment of the present invention.
Figure 2:
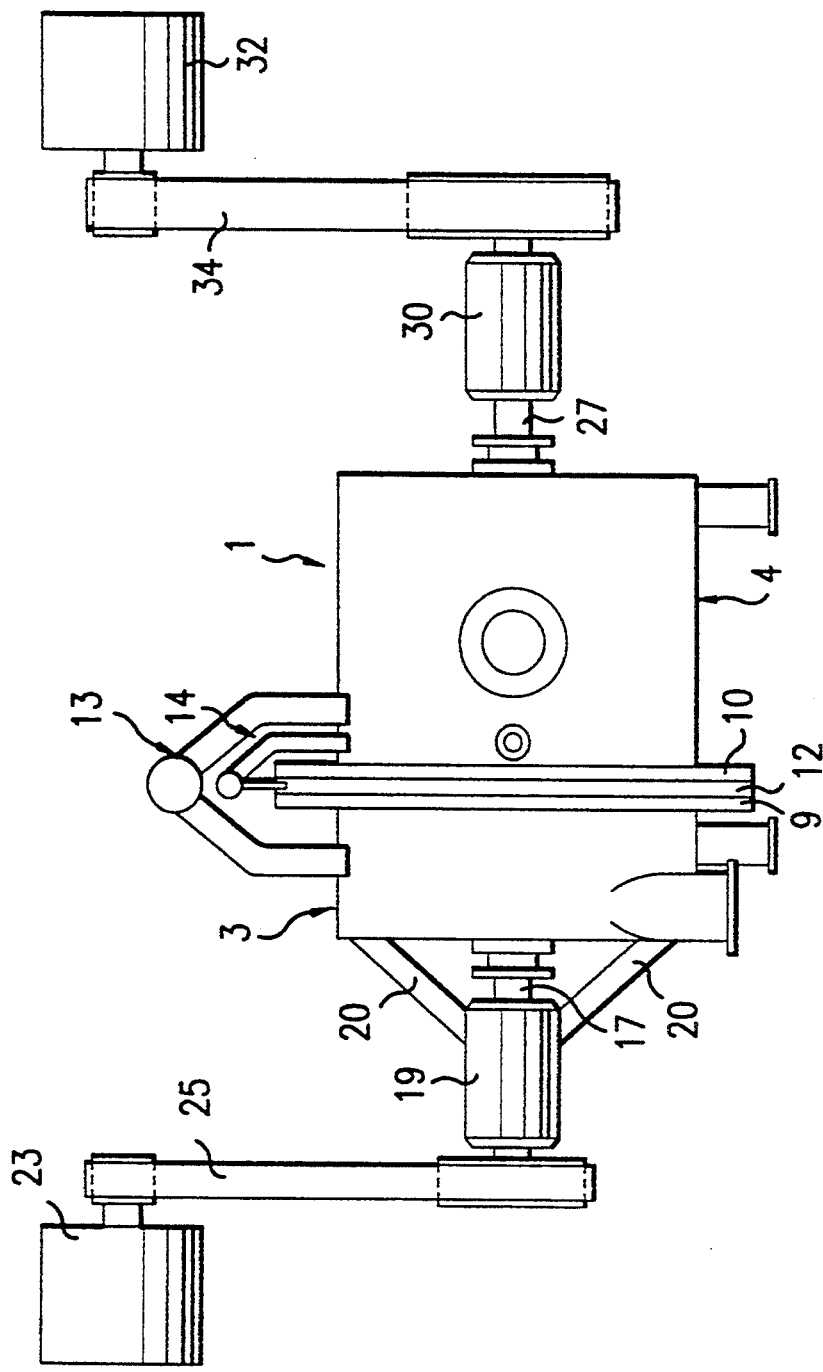
FIG. 2. is a schematic plan view showing a state in which a machine main body of the composite type screen of FIG. 1 is closed.

A paper making composite type screen of an embodiment of the present invention will be described with reference to the accompanying drawings.

A first disk-shaped screen member, e.g., a screen plate 2 having round holes 2A is disposed in a machine main body 1 supported on a machine base E to separate a primary or first processing chamber C from a secondary or second processing chamber D.

The machine main body 1 is composed of metal and the like and divided into a first structural part 3 in which the first processing chamber C is contained and a second structural part 4 in which the second processing chamber D is contained and the position corresponding to the outer periphery of the screen plate 2 is used as a boundary between the first structural part 3 and the second structural part 4.

The first structural part 3 includes a cylindrical barrel portion 3A and a closed portion 3B for closing an end of the barrel portion 3A, and the second structural part 4 includes a cylindrical barrel portion 4A and a closed portion 4B for closing an end of the barrel portion 4A.

The barrel portion 3A of the first structural part 3 includes a material inlet (paper material inlet) 5 and a first foreign substance discharge port 6, whereas the barrel portion 4A of the second structural part 4 includes a material outlet, e.g., a paper material outlet 7, a second foreign substance discharge port 8 and a diluted water inlet 11.

A flange 9 is provided with the open end of the barrel portion 3A and a flange 10 is provided with the open end of the barrel portion 4A. An annular holding plate 12 is interposed between the surfaces of the first structural part 3 and second structural part 4 or between the flange 9 and the flange 10.

The screen plate 2 is fixed around the inner periphery of the holding plate 12 by fixing means (not shown), e.g., bolts and the like.

The first structural part 3 is connected to the second structural part 4 by a first hinge 13 by which the barrel portion 3A is connected to the barrel portion 4A so that they can be freely opened and closed. Further, a second hinge 14 connected to the second barrel portion 4A is disposed on the outer periphery of the holding plate 12 so that it is freely attached to and separated from the openings of the first and second structural parts 3 and 4. Note, the second hinge 14 may be connected to the barrel portion 3A.

A plurality of holes (not shown) is formed in the flanges 9, 10 and holding plate 12 around the same circumference thereof so that the first structural part 3 is fixed to the second structural part 4 in a closed state by a plurality of bolts (not shown) inserted into the holes.

A second screen member, e.g., a cylindrical basket screen 16 is fixed around the inner periphery of the barrel portion 4A through a holder 15. The basket screen 16 has a number of slits 16A defined along the axial direction thereof and is fixed to the holder 15 shown bolts and the like (not shown). Each slit 16A has a width set smaller than the inner diameter of the round hole 2A.

A shaft hole 17 is defined at substantially the center of the closed portion 3B and a first rotary shaft 18 is disposed in a horizontal direction through the shaft hole 17. The gap between the shaft hole 17 and the fist rotary shaft 18 is sealed by a seal member, e.g. a mechanical seal F.

A first stirring member , e.g., an impeller 19 is mounted to an end of the first rotary shaft 18 or the end thereof in the primary processing chamber C side.

A bearing 21 is disposed outside the machine main body 1, e.g., the closed portion 3B through arms 20 and supports the first rotary shaft 18. A follower pulley 22 is mounted to the other end of the first rotary shaft 18.

A drive source, e.g., a motor 23 is disposed outside the machine main body 1 in the vicinity thereof and a belt 25 is stretched around the drive pulley 24 of the motor 23 and the follower pulley 22. The motor 23 is disposed so that the drive pulley 24 and follower pulley 22 are disposed at different positions on a plane.

A shaft hole 26 is defined at substantially the center of the closed portion 4B and a second rotary shaft 27 is disposed in a horizontal direction through the shaft hole 26. The first rotary shaft 18 and second rotary shaft 27 are concentrically disposed and the gap between the shaft hole 26 and the second rotary shaft 27 is sealed by a seal member, e.g., a mechanical seal G.

A second stirring member, e.g., a cylindrical rotor 28 having not shown projections, blades and the like (not shown) disposed around the outer periphery thereof is mounted to an end of the second rotary shaft 27 or the end thereof on a side of the secondary processing chamber D. The rotor 28 has an outside diameter smaller than the inside diameter of the basket screen 16 and the rotor 28 is disposed, for example, inside the basket screen 16 along the flow of a raw material.

A bearing 30 is disposed outside the machine main body 1 and located on a holding table 29. The second rotary shaft 27 is supported by the bearing 30. A follower pulley 31 is mounted to the other end of the second rotary shaft 27.

A drive source, e.g., a motor 32 is disposed outside the machine main body 1 in the vicinity thereof and a belt 34 is stretched around the drive pulley 33 of the motor 32 and the follower pulley 31.

In this embodiment, a raw material, e.g., a paper material such as pulp, used paper and the like, is charged under a predetermined pressure from a pump and the like (not shown) into the primary processing chamber C through the paper material inlet 5.

The impeller 19 is rotated together with the primary rotary shaft 18 by the driving force of the motor 23 (at, for example, about 1200 rpm to 1800 rpm) and unravels the paper material while stirring the same.

The unravelled paper material is roughly selected when it passes through the round holes 2A of the screen plate 2 and enters the second processing chamber D. Foreign substances (for example, plastic pieces, metal pieces, stone pieces and the like) which cannot pass through the round holes 2A are captured by the screen plate 2 and discharged from the first foreign substance discharge port 6.

When the rotor 28 is rotated together with the secondary rotary shaft 27 by the driving force of the motor 32 and stirs the paper material in the secondary processing chamber D, the paper material is finely selected when it passes through the slits 16A and discharged to the outside of the machine main body 1 from the paper material outlet 7. Water is supplied into the secondary processing chamber D from the dilute water inlet 11 adjust the paper material to a concentration lower than that of the paper material in the primary processing chamber C so that the paper material can be finely selected more easily.

Foreign substances which cannot pass through the slits 16A are captured by the basket screen 16 and discharged from the second foreign substance discharge port 8.

In this embodiment, since the impeller 19 and rotor 28 are separately mounted to the first rotary shaft 18 and second rotary shaft 27, the number of rotation of the impeller 19 can be set differently from that of the rotor 28.

For example, since the number of rotation of the impeller 19 and that of the rotor 28 can be controlled separately so that an optimum stirring and unravelling function can be obtained in accordance with various conditions such as whether the paper material is composed of used paper of corrugated paper or newspaper, a concentration of the paper material, a kind of fibers, a configuration of the impeller 19 and rotor 28, and the like, a foreign substance removing function can be improved.

Further, in this embodiment, since the first rotary shaft 18 and second rotary shaft 27 are separately disposed in the primary processing chamber C and secondary processing chamber D and do not pass through the screen plate 2, a seal member for the screen plate 2 is not needed. Therefore, the number of parts can be reduced and a manufacturing cost can be suppressed.

Further, in this embodiment, since the first rotary shaft 18 and second rotary shaft 27 do not pass through the screen plate 2 and there is no seal member for the screen plate 2, the paper material can pass through the entire region of the screen plate 2 and the area thereof through which the paper material passes can be increased. Therefore, a foreign material removing efficiency can be improved.

Figure 3:
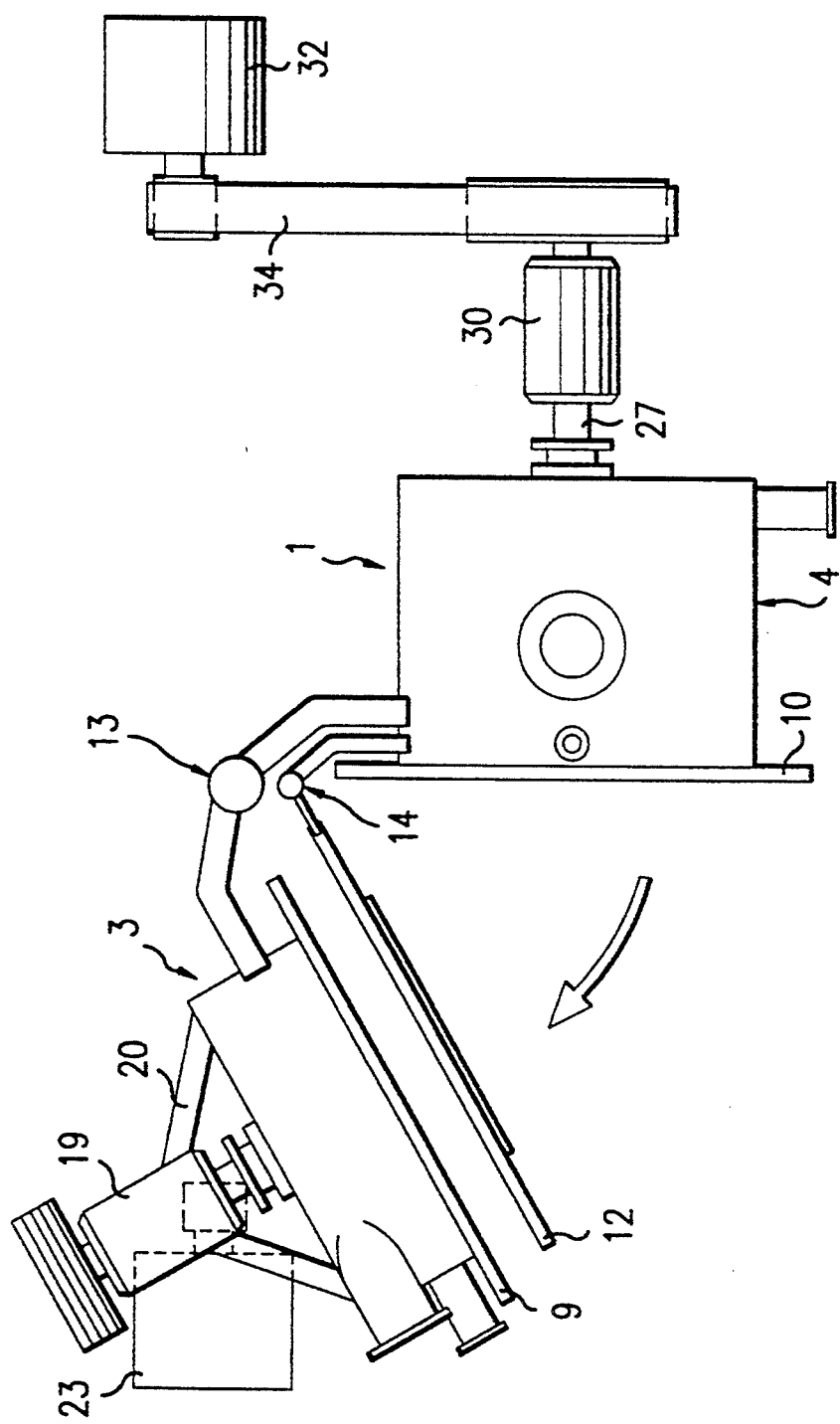
FIG. 3 is a schematic plan view showing a state in which the machine main body of the composite type screen of FIG. 1 is opened.
Figure 4:
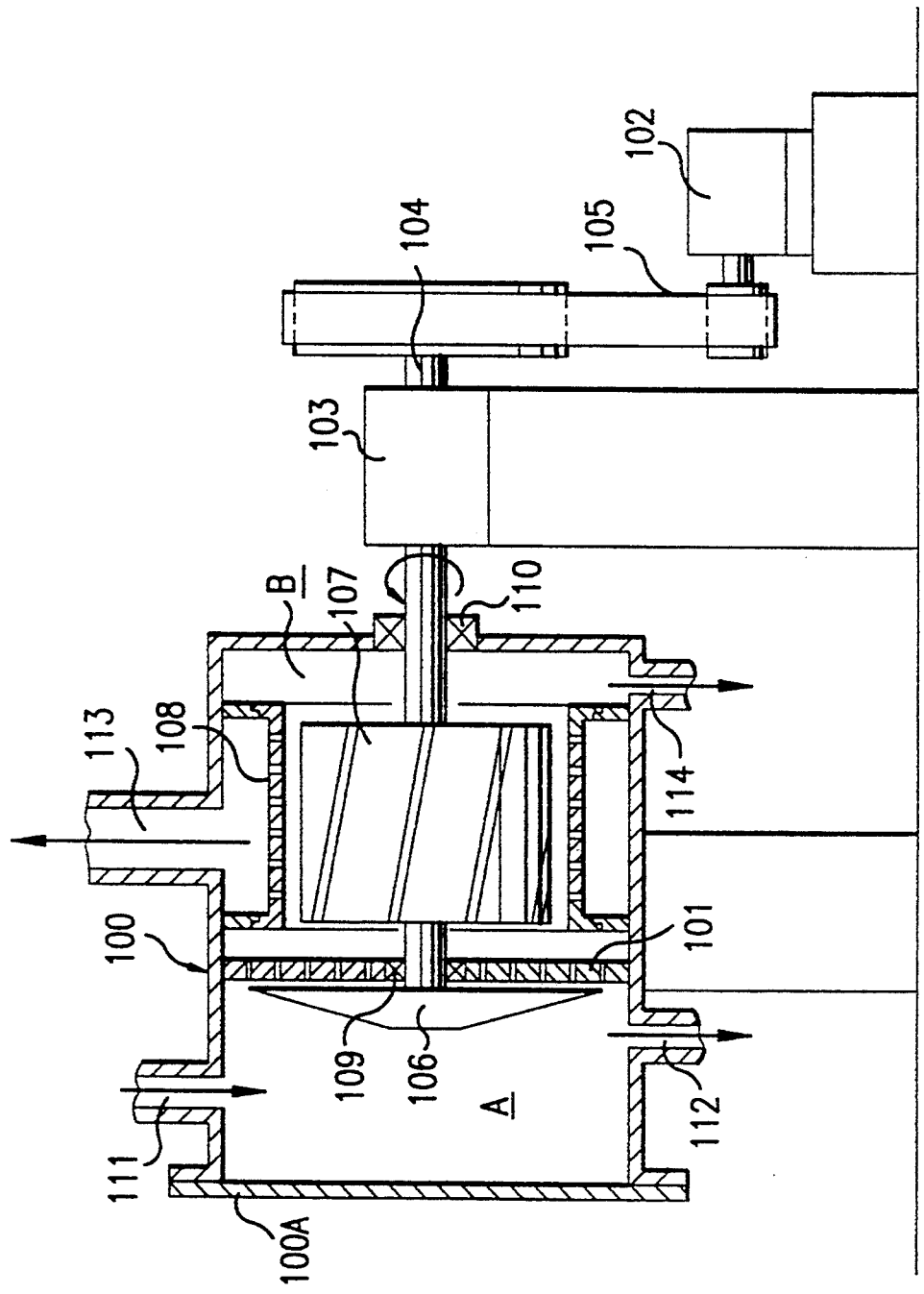
FIG. 4 is a schematic front cross sectional view of a composite type screen showing a conventional embodiment.

Further, in this embodiment, when the bolts by which the flanges 9, 10 are fixed are removed and the first structural part 3 is opened through the first hinge 13 as shown in FIG. 3, the screen plate 2 is exposed to the outside. Thus, the screen plate 2 can be cleaned and checked without removing parts in the machine main body 1 such as, for example, the rotor 28 from the second rotary shaft 27. Therefore, a manday and working time can be reduced and a working efficiency can be improved.

Further, in this embodiment, when the holding plate 12 is moved by the actuation of the second hinge 14, the screen plate 2 is separated from the first structural part 3 and second structural part 4 together with the holding plate 12 and a working area around the screen plate 2 is increased. Therefore, a working efficiency for cleaning and checking the interior of the primary processing chamber C, secondary processing chamber D and the screen plate and for replacing these components is further improved.

Note, the driving source used in this embodiment may be, for example, a gasoline engine, diesel engine and the like.

Further, the first structural part 3 may be automatically opened and closed by combining a mechanical means, e.g., a rotary shaft, gear mechanism and the like and an electric means, e.g., a motor and the like.

Note, when the first hinge 13 is connected to the second hinge 14 by a mechanical means, e.g., an auxiliary arm, the screen plate 2 is automatically separated from and abuts against the first structural part 3 and second structural part 4 in association with the opening and closing operation of the first structural part 3, so that workability can be further improved.

Further, the hinge 13 of this embodiment preferably has a strength and structure durable to the load of the parts such as the first structural part 3, first rotary shaft 18, bearing 21, screen plate 2 and the like.

Note, although this embodiment is described as the paper making composite type screen, it is not limited thereto but may be applied to generally used finely selecting machines

What is claimed is:

1. A composite type screen, comprising:
    a machine main body having first and second structural parts formed independently and arranged adjacent to each other so that the first and second structural parts can be separated from each other when disassembled;
    a first screen member formed independently and interposed between said first structural part and said second structural part to thereby form a first processing chamber in the first structural part and a second processing chamber in the second structural part;
    a raw material inlet and a first foreign substance discharge port, both being disposed in said first processing chamber;
    a raw material outlet disposed in said second processing chamber;
    a first stirring member and a first rotary shaft disposed in said first processing chamber without contacting the first screen member, said first rotary shaft supporting the first stirring member so that the first stirring member is located near the first screen member for rotation; and a second stirring member and a second rotary shaft disposed in said second processing chamber without contacting the first screen member, said second rotary shaft supporting the second stirring member.

2. A composite type screen according to claim 1, further comprising a first hinge situated between the first and second structural parts to open and close the same.

3. A composite type screen according to claim 2, further comprising a second hinge situated between the first screen and one of the first and second structural parts to attach the first screen to the machine body.

4. A composite type screen according to claim 1, further comprising a second screen member situated in the second processing chamber for covering the raw material outlet, and a second foreign substance discharge port disposed in said second processing chamber.

5. A composite type screen, comprising:

a machine main body containing therein a first structural part and a second structural part;

a first screen member disposed in said machine main body and interposed between surfaces of said first structural part and said second structural part, said first screen member dividing an interior of said machine main body into a first processing chamber and a second processing chamber, said first processing chamber being contained in the first structural part and said second processing chamber being contained in the second structural part;

a hinge provided to allow said first screen member to be freely attached to and separated from said first structural member and said second structural member;

a raw material inlet disposed in said machine main body for leading a raw material to said first processing chamber;

a first foreign substance discharge port disposed in said machine main body for leading a first foreign substance from said first processing chamber;

a first stirring member disposed in said first processing chamber;

a second stirring member and a second screen member sequentially disposed in said second processing chamber along flow of a raw material;

a raw material outlet disposed said machine main body and leading the raw material from said second processing chamber;

a second foreign substance discharge port disposed in said machine main body and leading a second foreign substance from said second processing chamber;

a first rotary shaft disposed in said first processing chamber and having said first stirring member mounted thereto; and a second rotary shaft disposed in said second processing chamber and having said second stirring member mounted thereto.

6. A composite type screen according to claim 5, wherein said first rotary shaft and said second rotary shaft are disposed in a horizontal direction.

7. A composite type screen according to claim 5, wherein said first stirring member is composed of an impeller, said second stirring member is composed of a cylindrical rotor, said first screen member is composed of a screen plate, and said second screen member is composed of a cylindrical basket screen.

8. A composite type screen according to claim 5, wherein said first stirring member is composed of an impeller, said second stirring member is composed of a cylindrical rotor, said first screen member is composed of a screen plate having round holes, and said second screen member is composed of a cylindrical basket screen having slits, said slits having a width set smaller than the inside diameter of said round holes.

9. A composite type screen according to claim 5, said composite type screen is used to make paper.

* * * * *